July 16, 1929.  F. SOLEY  1,721,476
LOCK FOR SPARE TIRES OF AUTOMOBILES
Filed Sept. 19, 1925  2 Sheets-Sheet 1
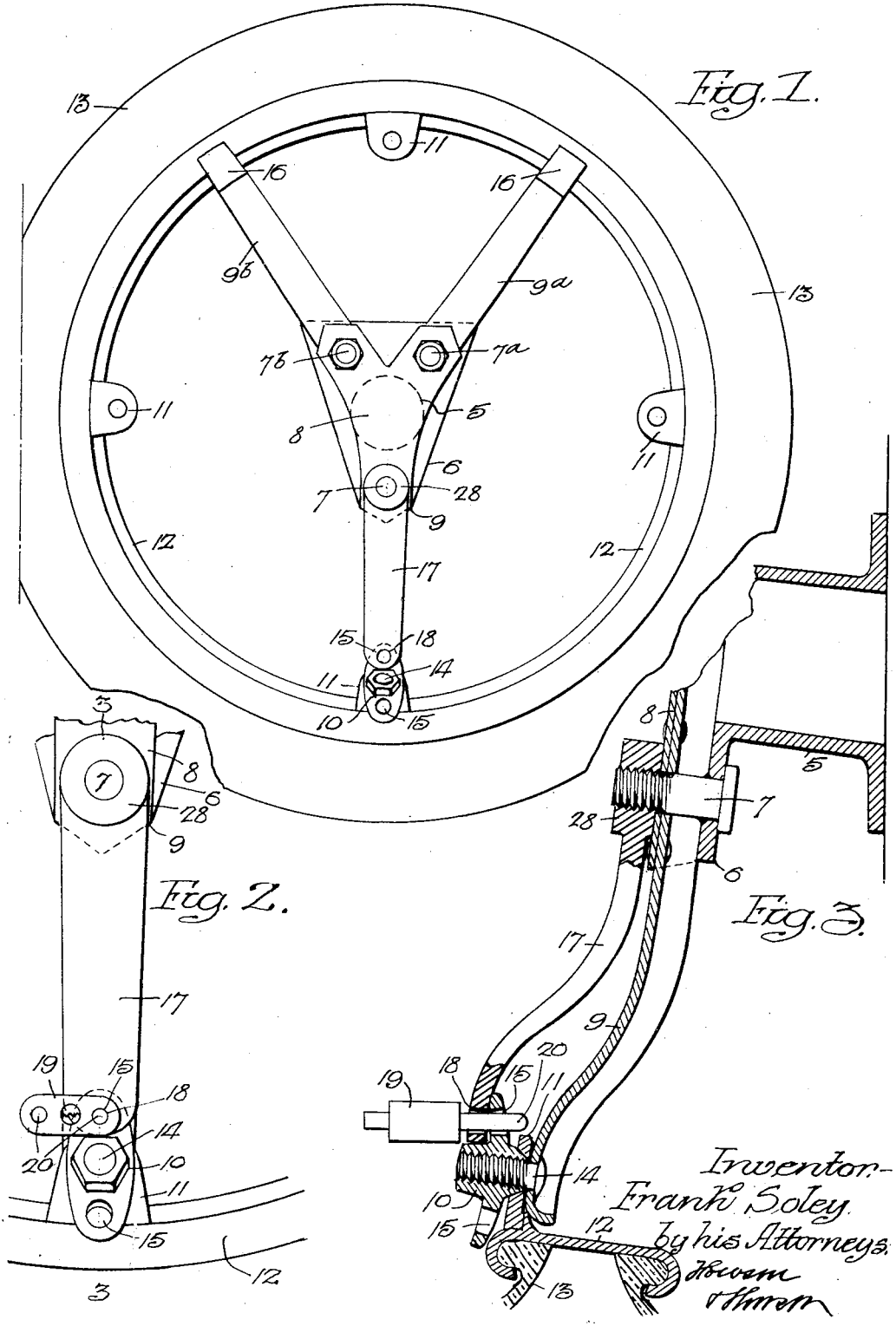

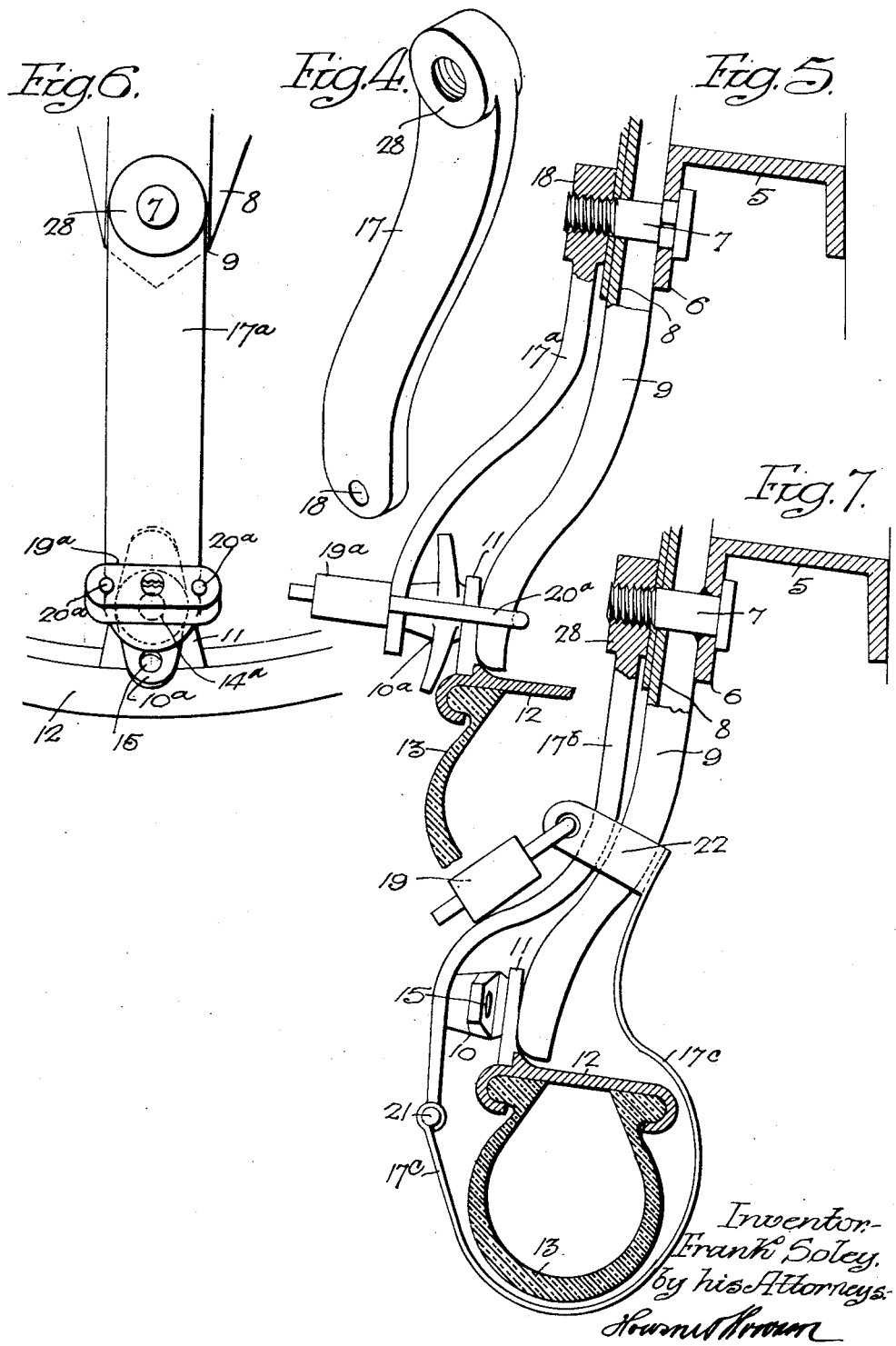

Patented July 16, 1929.

1,721,476

UNITED STATES PATENT OFFICE.

FRANK SOLEY, OF PHILADELPHIA, PENNSYLVANIA, ASSIGNOR, BY MESNE ASSIGNMENTS, TO THE YALE AND TOWNE MANUFACTURING COMPANY, OF STAMFORD, CONNECTICUT, A CORPORATION OF CONNECTICUT.

LOCK FOR SPARE TIRES OF AUTOMOBILES.

Application filed September 19, 1925. Serial No. 57,363.

The object of my invention is to provide means for locking a rim of a spare tire to a frame and to a bracket supporting the frame.

A further object of the invention is to provide means for not only locking the rim to the frame and bracket, but also the tire itself.

In the accompanying drawing:

Fig. 1 is a face view of a spare tire holder illustrating my invention;

Fig. 2 is an enlarged view of a portion of Fig. 1 showing the lock in position;

Fig. 3 is a sectional view on the line 3—3, Fig. 2;

Fig. 4 is a detached perspective view of the arm shown in Fig. 2;

Fig. 5 is a sectional view of a modification of the invention;

Fig. 6 is a face view of the modification shown in Fig. 5; and

Fig. 7 is another view illustrating the arrangement of my improved spare tire holder, in which the tire itself is held by the fastening device.

A bracket 5 is designed to be secured at the rear of an automobile in the present instance. The bracket has a flange 6, through which extend studs 7, 7$^a$ and 7$^b$. These studs are welded to the flange as shown in Fig. 3. A triangular frame 8 has arms 9, 9$^a$ and 9$^b$. This frame is mounted on the studs and secured thereto by nuts as shown in Fig. 1. The arm 9 has a stud 14 secured thereto at its outer end by welding. This stud is adapted to one of the lugs 11 of a rim 12 on which the tire 13 is mounted, and a winged nut 10 is mounted on the stud to hold the parts together. The wings are perforated as at 15.

The arms 9$^a$ and 9$^b$ are shaped at their outer ends 16 to fit the rim of a wheel, so that when the stud 14 is in position, the rim is securely attached to the frame 8. Ordinarily, no means is provided to prevent the removal of the entire frame 8 from the bracket. This cannot be permanently attached, as when the tire is located at the rear of an automobile, it acts as a bumper, and in many cases the frame becomes bent, so it must be so designed as to be readily replaced.

In order to lock the rim through the frame and bracket, an arm 17 is provided, having a threaded portion 28, which is substituted for the nut which is adapted to the stud 7. This arm acts as a nut to secure the frame to the bracket. The arm is of sufficient length so that the opening therein may be brought into alignment with the opening 15 in one wing of the nut 10.

A padlock 19, having a U-shaped shackle 20, is inserted through the two openings 15 and 18, locking the arm 17 in position, and preventing the turning of the winged nut and the removal of the frame 8 from the bracket, and also preventing the removal of the rim from the frame. By removing the lock, the arm can be swung around on the stud 7, and the rim with the tire can be readily detached from the frame.

In Figs. 5 and 6 a modification is shown, in which the arm 17$^a$ extends over the stud 14$^a$ and winged nut 10$^a$. The shackle 20$^a$ of a lock 19$^a$ confines the several parts together, preventing the turning of the winged nut and the turning of the arm 17$^a$.

In Fig. 7 is illustrated another modification, in which the arm 17$^b$ has a flexible extension 17$^c$ hinged thereto as at 21. The end of the flexible extension has a perforated forked end 22 which spaces the arm 9 and arm 17$^b$ and is shaped to receive the shackle of a padlock, so as to secure the tire in position and prevent its removal by deflation.

I claim:

1. The combination in a spare tire holder for automobiles, of a bracket permanently secured to the automobile; a frame mounted on the bracket and arranged to support the rim of a wheel on which the tire is mounted; screw-studs on the bracket, said studs extending through the frame; a locking arm threaded on one of said screw-studs; and means connecting the locking arm with the frame.

2. The combination in a spare tire holder for automobiles, of a bracket permanently secured to the automobile; a frame supporting the rim on which the tire is mounted; said frame having a plurality of arms; means for securing one of said arms to the rim; a screw-stud attaching the frame to the bracket; an arm having a threaded opening adapted to the screw-stud and acting as a nut, said arm extending to the means for attaching one of the arms of the frame to the rim; and locking means engaging both the arm and the first-mentioned means for attaching the frame to the rim.

3. The combination in a spare tire holder for automobiles, of a bracket forming a fixed part of an automobile; a frame mounted on the bracket and arranged to support the rim of a wheel on which a tire is mounted; a screw-stud on the bracket extending through the frame; a locking arm having a threaded opening adapted to the screw-stud and arranged to clamp the frame to the bracket; and means connecting the locking arm with the frame some distance from the stud.

4. The combination of a bracket; a frame supporting a rim of a wheel; a screw-stud on the bracket, said stud extending through the frame; an arm on the frame having a screw-stud at its outer end, arranged to extend through a lug on the wheel rim; a nut mounted on the last-mentioned stud and having perforated wings; an arm mounted on the first-mentioned stud and perforated in line with one of the perforations in the winged nut; and a lock having a shackle extending through the aligned perforation in the arm and winged nut.

FRANK SOLEY.